US009319925B2

(12) United States Patent
Liang

(10) Patent No.: US 9,319,925 B2
(45) Date of Patent: Apr. 19, 2016

(54) COMMUNICATION SYSTEM AND METHOD FOR CONVERGING DIFFERENT ACCESS TECHNOLOGIES

(75) Inventor: Xiguang Liang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/234,626

(22) PCT Filed: Aug. 31, 2011

(86) PCT No.: PCT/CN2011/079188
§ 371 (c)(1),
(2), (4) Date: Jan. 23, 2014

(87) PCT Pub. No.: WO2012/151813
PCT Pub. Date: Nov. 15, 2012

(65) Prior Publication Data
US 2014/0179310 A1 Jun. 26, 2014

(30) Foreign Application Priority Data
Jul. 25, 2011 (CN) .......................... 2011 1 0208991

(51) Int. Cl.
H04W 4/00 (2009.01)
H04W 28/02 (2009.01)
(Continued)

(52) U.S. Cl.
CPC ............ *H04W 28/0226* (2013.01); *H04W 8/04* (2013.01); *H04W 48/18* (2013.01); *H04W 36/0066* (2013.01); *H04W 88/06* (2013.01)

(58) Field of Classification Search
CPC ......... H04W 4/00; H04W 4/001; H04W 4/26; H04W 8/02; H04W 8/04; H04W 8/06–8/30; H04W 12/00; H04W 36/00–36/385; H04W 40/00–40/38
USPC ........... 455/406, 411–412, 422.1, 432.1, 433, 455/435.2, 436–444, 428, 450, 455, 464; 370/310.2, 322, 328, 331, 338
See application file for complete search history.

(56) References Cited

U.S. PATENT DOCUMENTS 5,933,784 A * 8/1999 Gallagher et al. .......... 455/552.1
6,269,252 B1 * 7/2001 Hutchings et al. ......... 455/552.1
(Continued)

FOREIGN PATENT DOCUMENTS

CN 1728577 A 2/2006
CN 101207913 A 6/2008
(Continued)

OTHER PUBLICATIONS

International Search Report in international application No. PCT/CN2011/079188, mailed on Apr. 19, 2012.
(Continued)

Primary Examiner — Steve D Agosta
(74) Attorney, Agent, or Firm — Oppdahl Patent Law Firm LLC

(57) ABSTRACT

A communication system and a communication method for converging different access technologies are disclosed. The method includes: a convergence terminal accesses a network converging different access technologies, and transmits a traffic request message including a traffic identifier to a convergence access switch via an access network when the convergence terminal is required to perform traffic (201); the convergence access switch acquires an address of traffic server according to the traffic identifier in the received traffic request message, and forwards the traffic request message including the traffic identifier to the traffic server (202); and the traffic server performs information interaction with a Home Subscriber Server (HSS), and provides traffic through the network converging different access technologies when it is determined that the traffic server is able to provide the traffic to a user corresponding to the convergence terminal (203). With the system and the method of the disclosure, networks provided by various wireless mobile communication technologies can provide communication traffics cooperatively, thus improving user experience.

11 Claims, 4 Drawing Sheets

(51) Int. Cl.
*H04W 8/04* (2009.01)
*H04W 48/18* (2009.01)
*H04W 88/06* (2009.01)
*H04W 36/00* (2009.01)

(56) References Cited

U.S. PATENT DOCUMENTS

| | | | |
|---|---|---|---|
| 6,654,606 B1 | 11/2003 | Foti | |
| 6,658,260 B2* | 12/2003 | Knotts | 455/466 |
| 6,697,620 B1* | 2/2004 | Lamb et al. | 455/432.1 |
| 6,751,207 B1* | 6/2004 | Lee et al. | 370/338 |
| 7,054,661 B1* | 5/2006 | Kohli et al. | 455/560 |
| 7,127,235 B2* | 10/2006 | Kenyon et al. | 455/412.1 |
| 7,349,698 B2* | 3/2008 | Gallagher et al. | 455/435.2 |
| 8,169,983 B2* | 5/2012 | Janky et al. | 370/338 |
| 8,831,645 B2* | 9/2014 | Agarwal et al. | 455/457 |
| 2006/0052130 A1* | 3/2006 | Choksi | 455/552.1 |
| 2006/0135127 A1* | 6/2006 | Aarnio et al. | 455/412.1 |
| 2006/0229078 A1* | 10/2006 | Itzkovitz et al. | 455/445 |
| 2006/0246903 A1* | 11/2006 | Kong et al. | 455/437 |
| 2006/0270447 A1* | 11/2006 | Everson et al. | 455/552.1 |
| 2007/0136412 A1* | 6/2007 | Oba et al. | 709/200 |
| 2008/0125111 A1* | 5/2008 | Durig et al. | 455/426.1 |
| 2008/0159232 A1* | 7/2008 | Thalanany et al. | 370/332 |
| 2008/0280623 A1 | 11/2008 | Danne | |
| 2008/0311905 A1* | 12/2008 | Noldus et al. | 455/433 |

FOREIGN PATENT DOCUMENTS

| | | |
|---|---|---|
| CN | 101945435 A | 1/2011 |
| EP | 1708446 A1 | 10/2006 |

OTHER PUBLICATIONS

English Translation of the Written Opinion of the International Search Authority in international application No. PCT/CN2011/079188, mailed on Apr. 19, 2012.

Soininen, Jonne et al., IPv6 Addressing Management in 3GPP Packet-Switched Cellular Networks, Nokia, Finland Oct. 11, 2004.

3GPP TS 43.318 V2.0.0, 3rd Generation Partnership Project; Technical Specification Group GSM/EDGE Radio Access Network; Generic Access to the A/Gb interface; Stage 2 (Release 6), Jan. 26, 2005.

Supplementary European Search Report in European application No. 11865116.5, mailed on Mar. 12, 2015.

* cited by examiner

COMMUNICATION SYSTEM AND METHOD FOR CONVERGING DIFFERENT ACCESS TECHNOLOGIES

TECHNICAL FIELD

The disclosure relates to convergence technology of mobile network communications, and in particular to a communication system and a communication method for converging different access technologies.

BACKGROUND

Public wireless mobile communication technology began to enter people's life from the 80s of last century. In the past 30 years, the development of the public wireless mobile communication technology experienced two periods of analogue mobile communication technology and digital mobile communication technology. Also, the digital mobile communication technology experienced the development of second generation (2G), third generation (3G) and fourth generation (4G) mobile communication technologies. Moreover, with the further development of mobile communication technologies, there will be fifth generation and sixth generation mobile communication technologies for the digital mobile communication technology. In the meantime, short-distance wireless communication technology appears, such as Wireless Fidelity (WiFi), ZigBee and Bluetooth.

The 2G mobile communication technology includes Global System for Mobile communications (GSM) technology and Code Division Multiple Access (CDMA) technology. The 3G mobile communication technology includes Wideband Code Division Multiple Access (WCDMA) technology, CDMA-2000 technology and Time Division-Synchronous Code Division Multiple Access (TD-SCDMA) technology. The following 4G mobile communication technology includes Worldwide Interoperability for Microwave Access (WiMAX) technology, besides respective Long Term Evolution (LTE) technologies of all 3G mobile communication technologies. At present, when the above technologies are applied, one technology corresponds to one network and the networks can be intercommunicated. In other words, terminals located in two networks can exchange information. However, each network is independent of the other in equipment, operation and maintenance, management and even operator, and a user must use different Subscriber Identity Module (SIM) cards, different terminals and even needs to submit an application to different operators to obtain traffics of different wireless mobile communication technologies.

Actually, for users, what they need is communication, that is, to transmit information, such as voices, texts, pictures and videos, to a desired receiver with certain quality of service. As for what communication technology is adopted to implement the transmission of information, it is a problem that operators and equipment manufacturers need to take into account.

Because of their own limitations of different wireless mobile communication technologies, traffics provided by the different wireless mobile communication technologies are different. Generally, wireless mobile communication technologies appeared in the latter are compatible with pervious wireless mobile communication technologies. For example, in 3G and 4G times, the great improvement of communication bandwidth enables practical application of video traffics, however, users still need voice communication traffics that are well solved by the 2G mobile communication technology. For another example, relative to Universal Mobile Telecommunications System (UMTS) technology, General Packet Radio Traffic (GPRS) technology has a poor data transmission capability, but still can well meet the requirement of many low-bandwidth traffics.

In addition, due to some reasons such as operating strategies of operators, different wireless mobile communication technologies probably provide different wireless coverage. For example, a certain area which is not covered by the 3G mobile communication technology is well covered by the 2G mobile communication technology. Even if in the case of same coverage, in some emergent and special conditions, capacity of a kind of wireless mobile communication technology probably has exhausted while another kind of wireless mobile communication technology has surplus capacity. However, the surplus communication resources cannot be applied due to reasons of terminals and operations.

Moreover, for operators, different wireless mobile communication technologies lead to different devices, so that repeated construction of many devices is caused inevitably. Actually, the difference in these wireless mobile communication technologies mainly is embodied in wireless communication, which occupies one part of the communication system only. Since the emergence and the development of different wireless mobile communication technologies have relative independence, processing methods for one same user communication requirement may be different. If these wireless mobile communication technologies are analyzed and systemized comprehensively, the sharing degree of devices would be increased undoubtedly, so as to save a great number of resources and energies.

It can be seen from the above descriptions that, in the related art, different wireless mobile communication technologies are independent of each other and a terminal generally performs communication traffics through the network provided by one wireless mobile communication technology only. In other words, networks provided by various existing wireless mobile communication technologies cannot provide communication traffics cooperatively. Therefore, the cost of operation and maintenance is large and user experience is poor.

SUMMARY

In view of the above, the disclosure is mainly intended to provide a communication system and a communication method for converging different access technologies, which can solve the defect that networks provided by wireless mobile communication technologies cannot provide communication traffics cooperatively and thus can improve user experience.

To this end, a technical solution of the disclosure is implemented as follows.

A communication system for converging different access technologies is provided by the disclosure, which includes: a convergence terminal, a first access network and a convergence core network, and the convergence core network further includes a first convergence access switch, a traffic server and a Home Subscriber Server (HSS), wherein the convergence terminal is configured to access a network converging different access technologies, and to transmit a traffic request message including a traffic identifier to the first convergence access switch via the first access network when the convergence terminal is required to perform traffic;

the first convergence access switch is configured to acquire an address of the traffic server after the traffic request message including the traffic identifier is received, and to forward the traffic request message including the traffic identifier to the traffic server;

the traffic server is configured to perform information interaction with the HSS after the traffic request message forwarded by the first convergence access switch is received, and to provide traffic through the network converging different access technologies when it is determined that the traffic server is able to provide the traffic to a user corresponding to the convergence terminal; and the HSS is configured to perform information interaction with the traffic server and to determine whether the traffic server is able to provide the traffic to the user corresponding to the convergence terminal.

In the solution above, the first convergence access switch may be further configured to determine, according to an available resource condition of the first convergence access switch, whether the traffic is able to be provided to the user corresponding to the convergence terminal, and to acquire the address of the traffic server when it is determined that the traffic is able to be provided to the user corresponding to the convergence terminal.

In the solution above, the system may further include a Business and Operation Support System (BOSS) configured to register user information to the HSS; and the HSS may be further configured to store the user information.

In the solution above, the traffic server may be further configured to perform charging and statistics processing on the traffic when the traffic is provided through the network converging different access technologies.

In the solution above, the system may further include a second access network, and the convergence core network may further include a second convergence access switch, wherein the convergence terminal is further configured to, when a cell handover is necessary, complete a handover process through message interaction between the convergence terminal and the first access network, message interaction between the first access network and the first convergence access switch, message interaction between the first convergence access switch and the second convergence access switch, message interaction between the second convergence access switch and the second access network, message interaction between the second access network and the convergence terminal, and message interaction between the second convergence access switch and the HSS;

the first access network is further configured to complete a handover process through message interaction with the convergence terminal and the first convergence access switch;

the first convergence access switch is further configured to complete a handover process through message interaction with the first access network and the second convergence access switch;

the second convergence access switch is further configured to complete a handover process through message interaction with the first convergence access switch, the second access network and the HSS;

the second access network is further configured to complete a handover process through message interaction with the second convergence access switch and the convergence terminal; and the HSS is further configured to complete a handover process through message interaction with the second convergence access switch.

A communication method for converging different access technologies is also provided by the disclosure, which includes:

a convergence terminal accesses a network converging different access technologies, and transmits a traffic request message including a traffic identifier to a convergence access switch via an access network when the convergence terminal is required to perform traffic;

the convergence access switch acquires an address of a traffic server according to the traffic identifier in the received traffic request message, and forwards the traffic request message including the traffic identifier to the traffic server; and the traffic server performs information interaction with an HSS, and provides traffic through the network converging different access technologies when it is determined that the traffic server is able to provide the traffic to a user corresponding to the convergence terminal.

In the solution above, the step that a convergence terminal transmits a traffic request message including a traffic identifier to a convergence access switch via an access network may include:

the convergence terminal transmits the traffic request message including the traffic identifier to the access network; and after the traffic request message is received by the access network when it is determined, according to resource of the access network, that the traffic is able to be provided to the user corresponding to the convergence terminal, the access network transmits the traffic request message to the convergence access switch.

In the solution above, before the address of the traffic server is acquired, the method may further include:

the convergence access switch determines, according to an available resource condition of the convergence access switch, whether the traffic is able to be provided to the user corresponding to the convergence terminal.

In the solution above, the step that the address of the traffic server is acquired may include:

the convergence access switch acquires the address of the traffic server according to traffic instance established by the convergence access switch; or the convergence access switch acquires the address of the traffic server by inquiring in an address parser.

In the solution above, before the traffic server performs information interaction with the HSS, the method may further include:

a BOSS registers user information to the HSS.

In the solution above, the step that the traffic server performs information interaction with the HSS when it is determined that the traffic server is able to provide traffic to the user corresponding to the convergence terminal may include:

after the traffic server receives the traffic request message and determines, according to the resource of the traffic server, that the traffic server is able to provide the traffic to the user corresponding to the convergence terminal, the traffic server establishes a traffic instance, acquires an address of an HSS corresponding to a user number according to the user number corresponding to the convergence terminal, and transmits traffic audit message to the HSS; and the HSS matches a user number and traffic identifier in the received traffic audit message with user information saved in the HSS, and when the matching succeeds, the HSS returns to the traffic server an audit response message which passes through an audit.

In the solution above, the step that the traffic is provided through the network converging different access technologies may include:

the traffic server establishes a traffic link between the convergence terminal and a called convergence terminal performing traffic with the convergence terminal through message interaction between the traffic server and a convergence access switch to which the called convergence terminal belongs, message interaction between the traffic server and an HSS storing user information of the celled convergence terminal, and message interaction between a convergence access switch connected with the called convergence terminal and an access network connected with the called convergence terminal; and media content of the traffic is exchanged between the convergence terminal and the called convergence terminal through the traffic link.

In the solution above, when the traffic is provided through the network converging different access technologies, the method may further include:

charging and statistics processing are performed on the traffic.

In the solution above, the method may further include:

after the traffic is completed, each network element providing service for the traffic releases its own resource corresponding to the traffic.

In the solution above, when communication is performed, the method may further include:

when it is determined that a cell handover is necessary, the convergence terminal completes a handover process through message interaction with the access network, message interaction between the access network and the convergence access switch, message interaction between the convergence access switch and a convergence access switch to which the switched cell belongs, message interaction between the convergence access switch to which the switched cell belongs and an access network to which the switched cell belongs, message interaction between the access network to which the switched cell belongs and the convergence terminal, and message interaction between the convergence access switch to which the switched cell belongs and the HSS.

With the communication system and the communication method for converging different access technologies provided by the disclosure, a convergence terminal accesses a network converging different access technologies, and transmits a traffic request message including a traffic identifier to a convergence access switch via an access network when the convergence terminal is required to perform traffic; the convergence access switch acquires an address of traffic server according to the traffic identifier in the received traffic request message, and forwards the traffic request message including the traffic identifier to the traffic server; and the traffic server performs information interaction with an HSS, and provides traffic through the network converging different access technologies when it is determined that the traffic server is able to provide the traffic to a user corresponding to the convergence terminal. In this way, networks provided by various wireless mobile communication technologies can provide communication traffics cooperatively, thus improving user experience.

In addition, multiple access technologies can be converged into a network, so that the sharing degree of network devices can be increased, the cost of devices can be reduced and the cost of maintenance can be reduced.

DETAILED DESCRIPTION

The disclosure is further elaborated below with reference to the drawings and embodiments.

Figure 1:
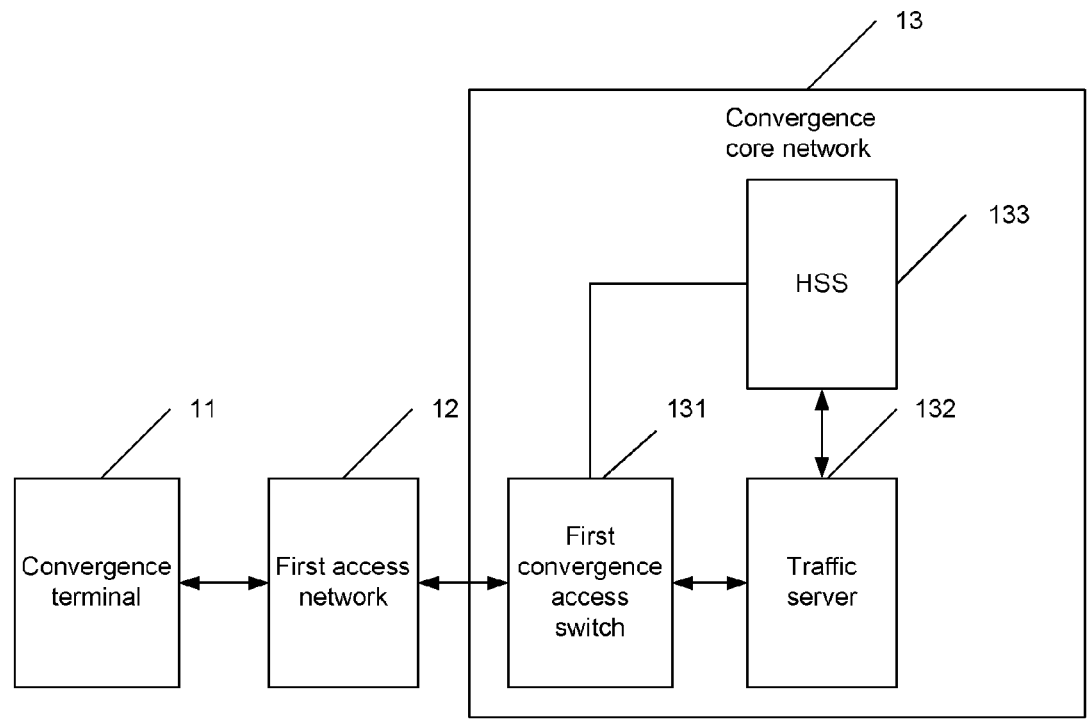
FIG. 1 shows a structure diagram of a communication system for converging different access technologies according to the disclosure.

A communication system for converging different access technologies according to the disclosure is as shown in FIG. 1. The communication system includes: a convergence terminal 11, a first access network 12 and a convergence core network 13. The convergence core network 13 further includes a first convergence access switch 131, a traffic server 132 and an HSS 133.

The convergence terminal 11 is configured to access a network converging different access technologies, and to transmit a traffic request message including a traffic identifier to the first convergence access switch 131 via the first access network 12 when the convergence terminal 11 is required to perform traffic.

The first convergence access switch 131 is configured to acquire an address of the traffic server after the traffic request message including the traffic identifier is received, and to forward the traffic request message including the traffic identifier to the traffic server 132.

The traffic server 132 is configured to perform information interaction with the HSS after the traffic request message forwarded by the first convergence access switch 131 is received, and to provide traffic through the network converging different access technologies when it is determined that the traffic server 132 is able to provide the traffic to a user corresponding to the convergence terminal.

The HSS 133 is configured to perform information interaction with the traffic server 132 and to determine whether the traffic server 132 is able to provide the traffic to the user corresponding to the convergence terminal 11.

The first convergence access switch 131 is further configured to determine, according to an available resource condition of the first convergence access switch 131, whether the traffic is able to be provided to the user corresponding to the convergence terminal 11, and to acquire the address of the traffic server 132 when it is determined that the traffic is able to be provided to the user corresponding to the convergence terminal 11.

The system can further include a BOSS 14 configured to register user information to the HSS 133; and the HSS is further configured to store the user information.

The traffic server 132 is further configured to perform charging and statistics processing on the traffic when providing the traffic through the network converging different access technologies.

The convergence terminal 11 is further configured to release its own resource corresponding to the traffic after the traffic is completed.

The first access network 12 is further configured to release its own resource corresponding to the traffic after the traffic is completed.

The first convergence access switch 131 is further configured to release its own resource corresponding to the traffic after the traffic is completed.

The traffic server 132 is further configured to release its own resource corresponding to the traffic after the traffic is completed.

The system can further include a second access network, and the convergence core network 13 can further include a second convergence access switch.

The convergence terminal 11 is further configured to, when a cell handover is necessary, complete a handover process through message interaction between the convergence terminal 11 and the first access network 12, message interaction between the first access network 12 and the first convergence access switch 131, message interaction between the first convergence access switch 131 and the second convergence access switch, message interaction between the second convergence access switch and the second access network, message interaction between the second access network and the convergence terminal 11, and message interaction between the second convergence access switch and the HSS 133.

The first access network 12 is further configured to complete a handover process through message interaction with the convergence terminal 11 and the first convergence access switch 131.

The first convergence access switch 131 is further configured to complete a handover process through message interaction with the first access network 12 and the second convergence access switch.

The second convergence access switch is further configured to complete a handover process through message interaction with the first convergence access switch 131, the second access network and the HSS 133.

The second access network is further configured to complete a handover process through message interaction with the second convergence access switch and the convergence terminal 11.

The HSS 133 is further configured to complete a handover process through message interaction with the second convergence access switch.

In an access system for converging different access technologies provided by the disclosure, the access network 12 includes a wired access network and a wireless access network. The access network 12 generally includes a base station and a base station controller. However, with the enhancement of processing capability of a processor and Internet Protocol (IP) based transmission of an access network, the base station controller has been cancelled in an LTE system and the base station is directly connected with a core network and undertakes most original functions of the base station controller. Therefore, the base station controller is an optional network element in the disclosure. It is determined by specific access technology whether to configure a base station controller. In another word, the specific implementation of the access network is completely the same as in the related art. No matter whether the base station controller is provided, both the first access network 12 and the first convergence access switch 131 need to comply with the same protocol, so that the first convergence access switch 131 can be adapted to all access technologies. Correspondingly, the second access network and the second convergence access switch need to comply with the same protocol, so that the second convergence access switch can be adapted to all access technologies.

The convergence terminal 11, the access network and the convergence access switch all support multiple access technologies, through which a needed information transmission channel is established between the convergence terminal and a network converging different access technologies. The convergence access switch is a part of the convergence core network 13, responding to the edge and antenna of the convergence core network 13, and is configured to collect and distribute user traffic and to shield the difference between access networks for the convergence core network 13. The convergence access switch can shield the difference between different access technologies, so that the convergence core network 13 does not sense the difference but can be share these existing or upcoming access technologies. Here, the different access technologies correspond to different access networks. Besides the function described above, the HSS 15 and the convergence access switch can also undertake Home Agent (HA) function and Foreign Agent (FA) function respectively, thereby implementing the mobile IP function in the architecture of the disclosure.

Besides the traffic management function and the mobile management function described above, the convergence access switch has a channel management function. The traffic management function, the mobile management function and the channel management function are used to manage traffic information, user information and air interface resources respectively. Traffic management module, a mobile management module and a channel management module of the convergence access switch have the traffic management function, the mobile management function and the channel management function respectively. The channel management module is responsibility for management of air interface channels in the traffic scope of the convergence access switch, including addition, deletion, reconfiguration, inquiry and the like. The corresponding air interface resource includes: the type of an access network, the location of the access network, the capacity of the access network, and existing channels. A task of the mobile management module is to cooperate with the HSS 133, to manage the mobility of the convergence terminal 11 so as to timely update the location of the convergence terminal accessing a network so that the convergence terminal can be accessed by other terminals at any time, and to keep the continuity of traffic. Another function of the mobile management module is to serve as a Visitor Location Register (VLR) in the related art, that is, to save user data for query. The corresponding user information includes: a user identifier, an available traffic identifier, authentication information and access location information of the used convergence terminal. The traffic management module is configured to process traffics initiated or received by a user, and a main task of the traffic management module is to search for and forward traffic request to the traffic server. For a simple and common traffic, such as a simple voice call, the access switch can process the traffic independently without the participation of the traffic server. In order to accelerate relevant inquiry and to reduce overhead of relevant messages, the convergence access switch can also establish an instance for traffic request in its own traffic scope, for targeted management. The corresponding traffic information can include traffic identifier and a corresponding traffic server list, which are used for implementing forwarding of traffic requests. The traffic instance can include: a traffic identifier, a traffic instance identifier, a traffic server address, calling user information and called user information. An interface between the access network and the convergence access switch is established on the basis of general packet transmission mechanism, such as an IP, so as to bear signalling and traffic between the convergence terminal 11 and the network converging different access technologies and signalling and traffic between the access network and the access switch.

The HSS 133 stores and manages user information. The user information includes: a user number, an available traffic identifier, available resource, authentication information and used information of the convergence terminal. The information of the convergence terminal includes a terminal identifier, a terminal state and access location information of the terminal.

The convergence core network 13 is an exchange mechanism for information, which is applicable to all types of contents and traffics and is adapted to all access technologies.

The traffic server 132 generally controls the implementation of traffics. Small-scale traffic, such as Peer to Peer (P2P) voice communication traffic, can also be implemented in the convergence access switch.

Specific processing of the convergence terminal, the access network, the convergence access switch, the HSS and the traffic server included in the system of the disclosure are elaborated below.

Figure 2:
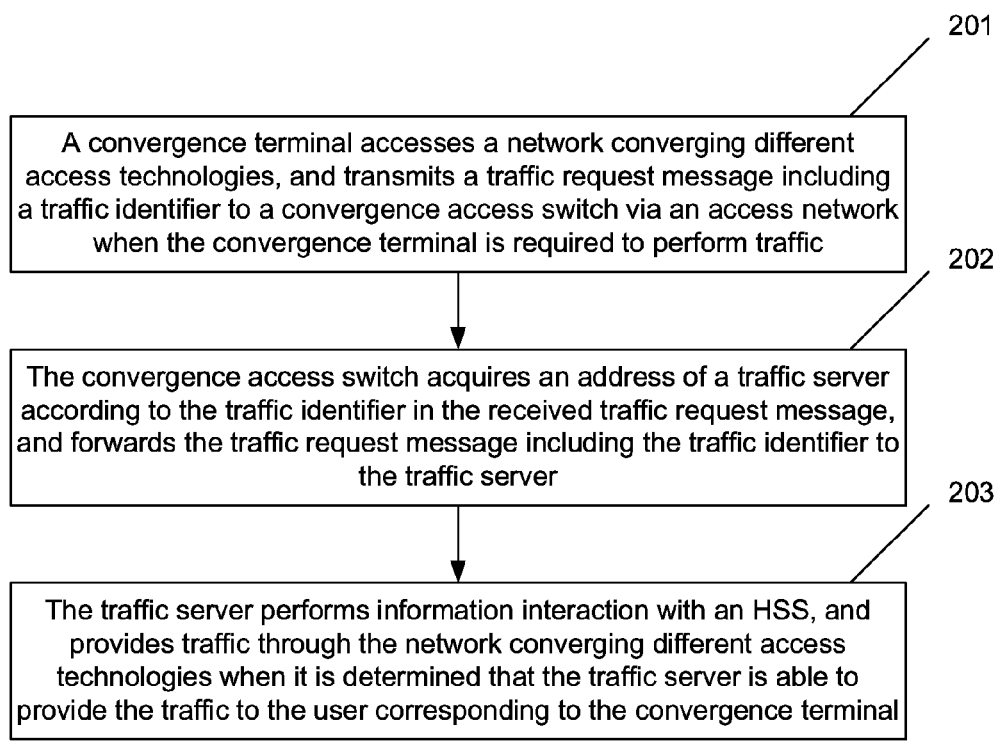
FIG. 2 shows a flowchart of a communication method for converging different access technologies according to the disclosure.

Based on the above system, the disclosure also provides a communication method for converging different access technologies. As shown in FIG. 2, the method includes the following steps:

Step 201: A convergence terminal accesses a network converging different access technologies, and transmits a traffic request message including a traffic identifier to a convergence access switch via an access network when the convergence terminal is required to perform traffic.

Here, the access network refers to an access network connected with the convergence terminal, and the convergence access switch refers to a convergence access switch which is connected with the convergence terminal via the access network and provides access traffic for the convergence terminal.

The step that the convergence terminal transmits the traffic request message including the traffic identifier to the convergence access switch via the access network specifically includes that:

the convergence terminal transmits the traffic request message including the traffic identifier to the access network; and after the traffic request message is received by the access network when determining that the resource of the access network is able to provide traffic to the user corresponding to the convergence terminal, the access network transmits the traffic request message to the convergence access switch.

The traffic request message further includes: a calling number, a called number and relevant parameters. Determining that the resource of the access network is able to provide traffic refers to that: the access network determines, according to the condition of its own available resource, that the traffic is able to be provided. The specific process that the access network determines, according to the condition of its own available resource, that the traffic is able to be provided can be implemented by existing technology.

Here, the accessing a network converging different access technologies refers to that: after the convergence terminal is powered on, the convergence terminal is synchronized with the base station of the access network through access technology corresponding to the access network according to a preset rule, to establish a control channel with the access network and to establish a control channel between the convergence terminal and the convergence access switch.

Here, the preset rule can be set as required, for example, according to a user preference, an agreement between a user and an operator, a network condition or traffic progress change.

If the access network determines, according to the condition of its own available resource, that the traffic is unable to be provided to the user corresponding to the convergence terminal, the access network returns to the convergence terminal information indicating that the access network is unable to provide traffic.

Step 202: The convergence access switch acquires an address of a traffic server according to the traffic identifier in the received traffic request message, and forwards the traffic request message including the traffic identifier to the traffic server.

Here, before the address of the traffic server is acquired, the method further includes:

the convergence access switch determines, according to the condition of its own available resource, whether the traffic is able to be provided to the user corresponding to the convergence terminal. The condition of available resources includes: memory resource, interface resource and the like. The specific process that the convergence access switch determines, according to the condition of its own available resource, that the traffic is able to be provided can be implemented by existing technology.

If the convergence access switch determines, according to the condition of its own available resource, that the convergence access switch is unable to provide traffic to the user corresponding to the convergence terminal, the convergence access switch returns, to the access network, information indicating that traffic is unable to be provided. After the information is received by the access network, the access network returns to the convergence terminal the information indicating that traffic is unable to be provided.

The process of acquiring the address of the traffic server specifically includes:

the convergence access switch acquires the address of the traffic server according to traffic instance established by the convergence access switch; or the convergence access switch acquires the address of the traffic server by searching in an address parser.

The traffic instance includes: a traffic identifier, a traffic instance identifier, a traffic server address, and other information related to the traffic instance, such as a user number. For traffic, after the convergence access switch establishes traffic instance of the traffic, the convergence access switch stores the traffic server address acquired from the address parser into the traffic instance, thereby avoiding the search for the traffic server address in the subsequent operation of the traffic. After the traffic instance of the traffic is established, the convergence access switch transmits the traffic instance identifier of the traffic to the convergence terminal via the access network through the established control channel. When the traffic is performed in the subsequent operation, the convergence terminal only needs to transmit traffic request message including the traffic instance identifier to the convergence access switch via the access network, without transmitting the traffic identifier, the calling number, the called number and relevant parameters. The address parser has saved the address of the traffic server in advance, and the specific process that the convergence access switch inquires in the address parser to acquire the address of the traffic server can be implemented by existing technology.

Step 203: The traffic server performs information interaction with an HSS, and provides traffic through the network converging different access technologies when it is determined that the traffic server is able to provide the traffic to the user corresponding to the convergence terminal.

Figure 3:
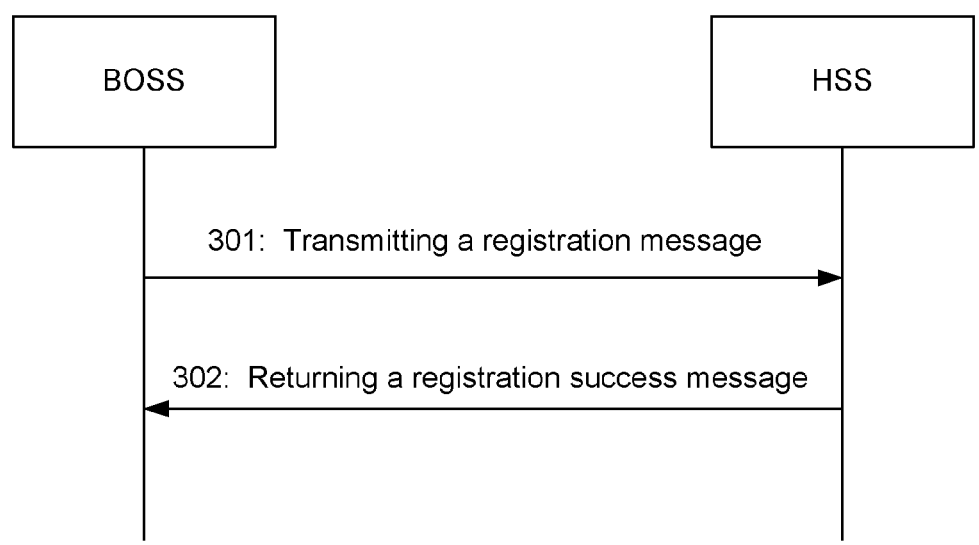
FIG. 3 shows a flowchart of a method for registering user information to an HSS.

Here, before the traffic server performs information interaction with the HSS, the method can further include:

a BOSS registers user information to the HSS. The specific process, as shown in FIG. 3, includes:

Step 301: An operator transmits a registration message to the HSS through the BOSS.

Step 302: After the registration message is received by the HSS, the HSS stores user information and returns a registration success message to the BOSS.

The registration message includes user information. The user information includes a user number, an available traffic identifier, available resource, authentication information and information of the used convergence terminal. The convergence terminal information includes: a terminal identifier, a terminal state and the like. Unlike the existing technology, the user information does not correspond to one access technology, such as GSM or CDMA. The authentication information and the authentication algorithm are adapted to all existing access technologies. During actual applications, an optimal authentication algorithm in the access technologies can be adopted. A specific authentication algorithm is selected by the operator and/or user.

The specific process of registering user information to the HSS by the BOSS belongs to the prior art, which is not repeated here.

The step that the traffic server performs information interaction with the HSS and determines that the traffic server is able to provide traffic to the user corresponding to the convergence terminal specifically includes:

after the traffic server receives the traffic request message and determines, according to the resource of the traffic server, that the traffic server is able to provide traffic to the user corresponding to the convergence terminal, the traffic server establishes traffic instance, acquires an address of an HSS corresponding to the convergence terminal according to a user number corresponding to the convergence terminal, and transmits traffic audit message to the HSS; and after the traffic audit message is received by the HSS, the HSS matches the user number and traffic identifier in the message with the user information stored in the HSS, and when the matching succeeds, the HSS returns, to the traffic server, an audit response message which passes through an audit.

The specific process that the traffic server determines, according to the condition of its own available resource, that the traffic server is able to provide traffic can be implemented by existing technology. The traffic instance includes: traffic identifier, traffic instance identifier, and other information related to the traffic instance, such as a user number and location information of the convergence access switch. The specific process of acquiring an address of an HSS corresponding to the convergence terminal according to the user number corresponding to the convergence terminal belongs to the prior art. The traffic audit message includes the user number, the traffic instance identifier, the traffic identifier and the like. The audit response message includes the traffic instance identifier. For traffic, the identifier of the traffic instance established by the traffic server and the identifier of the traffic instance established by the convergence access switch have a binding relationship.

When the traffic server determines, according to the condition of its own available resource, that the traffic server is unable to provide traffic to the user corresponding to the convergence terminal, the traffic server returns to the convergence access switch information indicating that the traffic server is unable to provide traffic to the user corresponding to the convergence terminal. After the information is received by the convergence access switch, the convergence access switch returns to the access network information indicating that traffic is unable to be provided. After the information is received by the access network, the access network returns to the convergence terminal the information indicating that traffic is unable to be provided.

After it is determined by the HSS that the matching is failed, the HSS returns to the traffic server an audit response message indicating audit failure. After the audit response message is received by the traffic server, the traffic server transmits, to the convergence access switch, information indicating that the traffic server is unable to provide traffic to the user corresponding to the convergence terminal. After the information is received by the convergence access switch, the convergence access switch returns to the access network the information indicating that traffic is unable to be provided. After the information is received by the access network, the access network returns to the convergence terminal the information indicating that traffic is unable to be provided.

The process of providing traffic through the network converging different access technologies specifically includes:

a traffic link between the convergence terminal and a called convergence terminal performing traffic with the convergence terminal is established through message interaction between the traffic server and a convergence access switch to which the called convergence terminal belongs, message interaction between the traffic server and an HSS storing the user information of the celled convergence terminal, and message interaction between a convergence access switch connected with the called convergence terminal and an access network connected with the called convergence terminal; and media content of traffic are exchanged between the convergence terminal and the called convergence terminal through the traffic link.

When the traffic is provided through the network converging different access technologies, the method can further include:

charging and statistics processing are performed on the traffic. The specific process of performing charging and statistics processing on the traffic belongs to the prior art, which is not repeated here.

The method can further include:

after the traffic is completed, each network element providing service for the traffic releases its own resource corresponding to the traffic.

Here, network elements providing service include: the convergence terminal, the access network connected with the convergence terminal, the convergence access switch to which the convergence terminal belongs, the traffic server, the called convergence terminal, the convergence access switch connected with the called convergence terminal, and the access network connected with the called convergence access switch.

When communication is performed, the method can further include:

when it is determined by the convergence terminal that a cell handover is necessary, the convergence terminal completes a handover process through message interaction with the access network, message interaction between the access network and the convergence access switch, message interaction between the convergence access switch and a convergence access switch to which the switched cell belongs, message interaction between the convergence access switch to which the switched cell belongs and the access network to which the switched cell belongs, message interaction between the access network to which the switched cell belongs and the convergence terminal, and message interaction between the convergence access switch to which the switched cell belongs and the HSS.

The disclosure is further elaborated below in conjunction with embodiments.

Embodiment 1

The application scene of the embodiment is that: a convergence terminal 1 has accessed a network converging different access technologies via an access network 1 and a convergence access switch 1. An HSS storing user information of the convergence terminal 1 is referred to as HSS 1. The convergence terminal 1, as a calling user, initiates traffic to communicate with a called user. A convergence terminal corresponding to the called user is referred to as convergence terminal 2.

Figure 4:
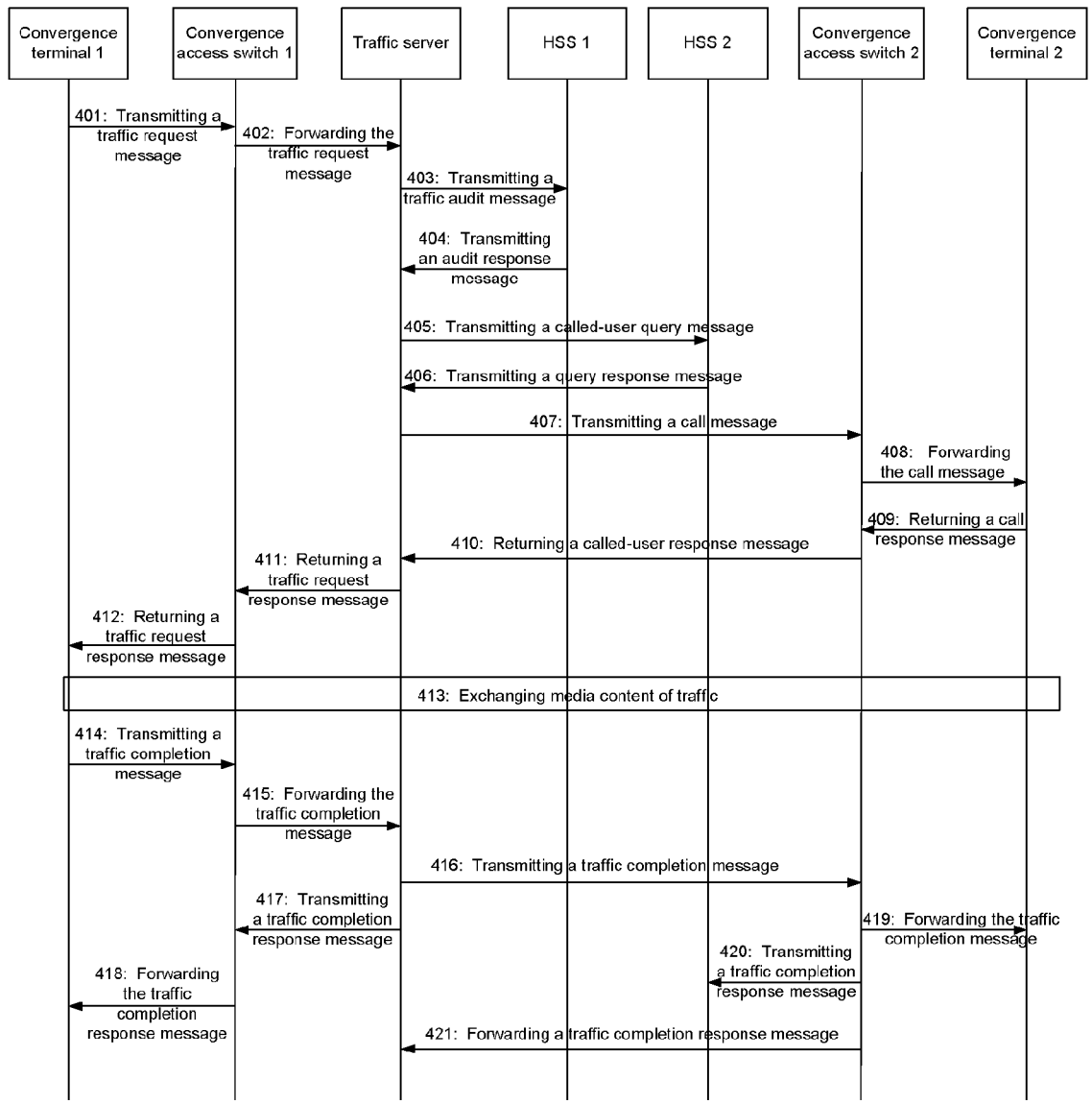
FIG. 4 shows a flowchart of a method for implementing traffic according to Embodiment 1.

An access network connected with the convergence terminal 2 is referred to as access network 2. A convergence access switch to which the convergence terminal 2 belongs is referred to as convergence access switch 2. An HSS storing user information of the convergence terminal 2 is referred to as HSS 2. The method for implementing traffic in the embodiment, as shown in FIG. 4, includes the following steps:

Step 401: The convergence terminal 1 powers on, accesses the network converging different access technologies, and transmits a traffic request message including a traffic identifier to the convergence access switch 1 via the access network 1 when the convergence terminal 1 is required to perform traffic.

Here, the accessing the network converging different access technologies refers to: it is hosted in the access network 1 by a manner similar to the prior art according to a strategy set based on an operator or a user preference. A control channel between the convergence terminal and the convergence access switch has been established. Here, the user preference can refer to: a beforehand agreement, signal intensity or channel quality.

When the convergence terminal is required to perform traffic, the user starts an application program in the convergence terminal 1, and transmits a traffic request message to the access network 1 through a channel corresponding to the access technology adopted by the convergence terminal 1, for example, a Random Access Channel (RACH) of GSM. After the access network 1 receives the traffic request message and determines, according to its own resource, that traffic is able to be provided to a user corresponding to the convergence terminal, the access network 1 converts the format of the received traffic request message according to a protocol agreed with the convergence access switch 1, and transmits the converted traffic request message to the convergence access switch 1. The specific process of converting the format of the received traffic request message can be the prior art.

The traffic request message includes: a calling number, a called number, a traffic identifier and relevant parameters.

Step 402: After the traffic request message is received, the convergence access switch 1 parses the received traffic request message, and when it is determined that traffic is able to be provided to the user corresponding to the convergence terminal 1, the convergence access switch 1 acquires the address of the traffic server according to the traffic identifier in the received traffic request message, and then forwards the traffic request message including the traffic identifier to the traffic server.

The process of acquiring the address of the traffic server specifically includes that:

the convergence access switch acquires the address of the traffic server by inquiring in an address parser; or the convergence access switch establishes a corresponding traffic instance and stores the address of the traffic server acquired from the address parser into the corresponding traffic instance.

The traffic instance includes: a traffic identifier, a traffic instance identifier, a traffic server address, and other information related to the traffic instance, such as a user number. For traffic, after the convergence access switch establishes traffic instance of the traffic, the convergence access switch stores the traffic server address acquired from the address parser into the traffic instance, thereby avoiding the search for the traffic server address in the subsequent operation of the traffic. After the traffic instance of the traffic is established, the convergence access switch transmits the traffic instance identifier of the traffic to the convergence terminal via the access network through the established control channel. When the traffic is performed in the subsequent operation, the convergence terminal only needs to transmit traffic request message including the traffic instance identifier to the convergence access switch via the access network, without transmitting the traffic identifier, the calling number, the called number and relevant parameters.

The address parser has saved the address of the traffic server in advance, and the specific process that the convergence access switch inquires in the address parser to acquire the address of the traffic server can be implemented by existing technology.

Step 403: The traffic server receives the traffic request message, establishes a traffic instance when it is determined that traffic is able to be provided to the user corresponding to the convergence terminal, acquires the address of the HSS1 according to the calling number corresponding to the convergence terminal 1, and transmits a traffic audit message to the HSS.

Here, the traffic audit message includes the user number, the traffic instance identifier, the traffic identifier and the like.

Step 404: After the traffic audit message is received, the HSS 1 matches the user number and traffic identifier in the traffic audit message with user information stored in the HSS 1, and when the matching succeeds, the HSS 1 returns to the traffic server an audit response message which passes through audit.

Here, the audit response message includes the traffic instance identifier.

When the convergence access switch 1 has stored the user information, that is, the convergence access switch 1 has the function of VLR, the convergence access switch 1 can audit the traffic by itself. After the audit is passed, the convergence access switch 1 transmits a traffic request message to the traffic server to notify that the audit is passed. At this moment, Step 403 and Step 404 do not need to be executed.

Step 405: After the audit response message is received, the traffic server transmits a called-user query message to the HSS 2.

Here, the called user query message is transmitted to inquire whether the called user and the convergence terminal 2 can receive the traffic. After it is determined that the called user and the convergence terminal 2 can receive the traffic, the location of the called user is further inquired.

The called-user query message includes: an traffic identifier of the traffic applied for by the calling user, the traffic instance identifier and the called number.

Step 406: After it is determined that the convergence terminal 2 can receive the call, the HSS 2 transmits a query response message to the traffic server.

Here, the query response message includes: the information relating to the convergence access switch in which the convergence terminal 2 is located, that is, the information of the convergence access switch 2. The information of the convergence access switch may specifically include: the address of the convergence access switch 2. The query response message further includes the traffic instance identifier.

The process that the HSS 2 determines that the convergence terminal 2 can receive the call specifically includes:

the HSS 2 determines that the user number and the traffic identifier in the message can be matched with the user information stored in the HSS 2.

Step 407: After the query response message is received, the traffic server transmits a call message to the convergence access switch 2 according to the address of the convergence access switch 2 in the query response message.

Here, the call message includes: the calling number, the called number, the traffic identifier, the traffic instance identifier and relevant parameters.

Step 408: After the call message is received, the convergence access switch 2 finds the called number from the call message, hereby finding the port corresponding to the access network of the called number, and forwards the call message to the convergence terminal 2 via the access network 2.

Here, the access network of the called number refers to the access network 2.

All user information stored by the convergence access switch in its own traffic scope, mainly include: location information of users, which corresponds to the port of the access switch connected with the corresponding access network.

While the convergence access switch 2 finds the port corresponding to the access network 2 and forwards the call message to the convergence terminal 2 via the access network 2, a traffic link is also established between the access network 2 and the access switch 2.

Step 409: After the call message is called, the convergence terminal 2 starts a corresponding traffic processing program, and returns a call response message to the convergence access switch 2 via the access network 2, and meanwhile cooperates with the access network 2 to complete the establishment of a traffic link air interface section indicated by the convergence access switch 2.

Here, the specific process of starting the corresponding traffic processing program is the prior art, which is not repeated here. After the convergence terminal 2 returns the call response message to the convergence access switch 2, it is indicated that the convergence terminal 2 is ready.

The specific process of cooperating with the access network 2 to complete the establishment of a traffic link air interface section indicated by the convergence access switch 2 is the prior art, which is not repeated here.

Step 410: After the convergence terminal 2 is called successfully, the convergence access switch 2 returns a called-user response message to the traffic server to indicate that the called user is ready.

Here, that the convergence terminal 2 is called successfully by the convergence access switch 2 refers to that: the call response message transmitted from the convergence terminal 2 is received by the convergence access switch 2.

Step 411: After the called-user response message transmitted from the convergence access switch 2 is received, the traffic server returns a traffic request response message to the convergence access switch 1 to indicate that the traffic application succeeds.

Here, the traffic request response message includes the traffic instance identifier.

Step 412: After the traffic request response message is received, the convergence access switch 1 returns to the convergence terminal 1 a traffic request response message indicating traffic are requested successfully via the access network 1, indicating that the traffic is started.

Here, the traffic request response message includes the traffic instance identifier.

During the execution of the step, the convergence terminal 1 cooperates with the access network 1 to establish the air interface section of traffic link. The access network 1 cooperates with the convergence access switch 1 to establish the ground section of traffic link, thereby completing the establishment of traffic link from the convergence terminal 1 to the convergence access switch 1.

Here, the specific process that the convergence terminal 1 cooperates with the access network 1 to establish the air interface section of traffic link is the prior art. The specific process that the access network 1 cooperates with the convergence access switch 1 to establish the ground section of traffic link can be implemented using existing technology.

Step 413: During the implementation of traffic, media content of traffic between the convergence terminal 1 and the convergence terminal 1 are exchanged through the established traffic link.

Here, during the exchange process, all media contents of traffic between the convergence terminal 1 and the convergence terminal 1 are forwarded correspondingly by the access network and the convergence access switch, or may be processed by the traffic server according to the specific condition of the media content. The exchange of media content can be implemented by existing technology.

Step 414: After the traffic is completed, the convergence terminal 1 transmits a traffic completion message to the convergence access switch 1 via the access network 1.

Here, the traffic completion message includes: the traffic identifier, the traffic instance identifier, a completion reason and the like. The completion reason may specifically be a normal completion.

Step 415: After the traffic completion message is received, the convergence access switch 1 forwards the traffic completion message to the traffic server according to the traffic identifier in the traffic completion message.

Here, the traffic completion message includes: the traffic identifier, the traffic instance identifier, the completion reason and the like. The completion reason may specifically be a normal completion.

Step 416: After the traffic completion message is received, the traffic server finds the corresponding traffic instance according to the traffic instance identifier in the traffic completion message, hereby finds the address of the convergence access switch 2, and finally transmits a traffic completion message to the convergence access switch 2.

Here, the traffic completion message includes: the traffic identifier, the traffic instance identifier, the completion reason and the like. The completion reason may specifically be a normal completion.

After the traffic server transmits the traffic completion message to the convergence access switch 2, the traffic instance of the traffic server enters a waiting-for-completion state.

Step 417: Meanwhile, the traffic server transmits a traffic completion response message to the convergence access switch 1.

Here, the traffic completion response message includes: the calling user identifier, the traffic identifier, and the traffic instance identifier.

Step 418: The convergence access switch 1 forwards the traffic completion response message to the convergence terminal 1 via the access network 1, and releases the resource of the convergence access switch 1 corresponding to the traffic.

Here, after the traffic completion response message is received, both the access network 1 and the convergence terminal 1 release their own resources corresponding to the traffic respectively.

Step 419: The convergence access switch 2 forwards the traffic completion message to the convergence terminal 2 via the access network 2.

Step 420: After the traffic completion message is received, the convergence terminal 2 releases its own resource corresponding to the traffic, and then transmits a traffic completion response message to the convergence access switch 2 via the access network 2.

Here, the traffic completion response message includes: the traffic identifier and the traffic instance identifier.

After the traffic completion response message is received, the access network 2 also releases its own resource corresponding to the traffic.

Step 421: The convergence access switch 2 forwards the received traffic completion response message to the traffic server, and releases its own resource corresponding to the traffic.

Here, after the traffic completion response message is received, the traffic server releases all resources used by the traffic instance corresponding to the traffic. So far, this traffic is completed. During an actual operation, the traffic server also participates in charging and statistics processing when performing traffic. Since the processing may be implemented existing technology, the relevant description is omitted here.

It should be noted that, during an actual application, there is no order in executing Steps 417 to 418 and Steps 419 to 421.

Embodiment 2

Figure 5:
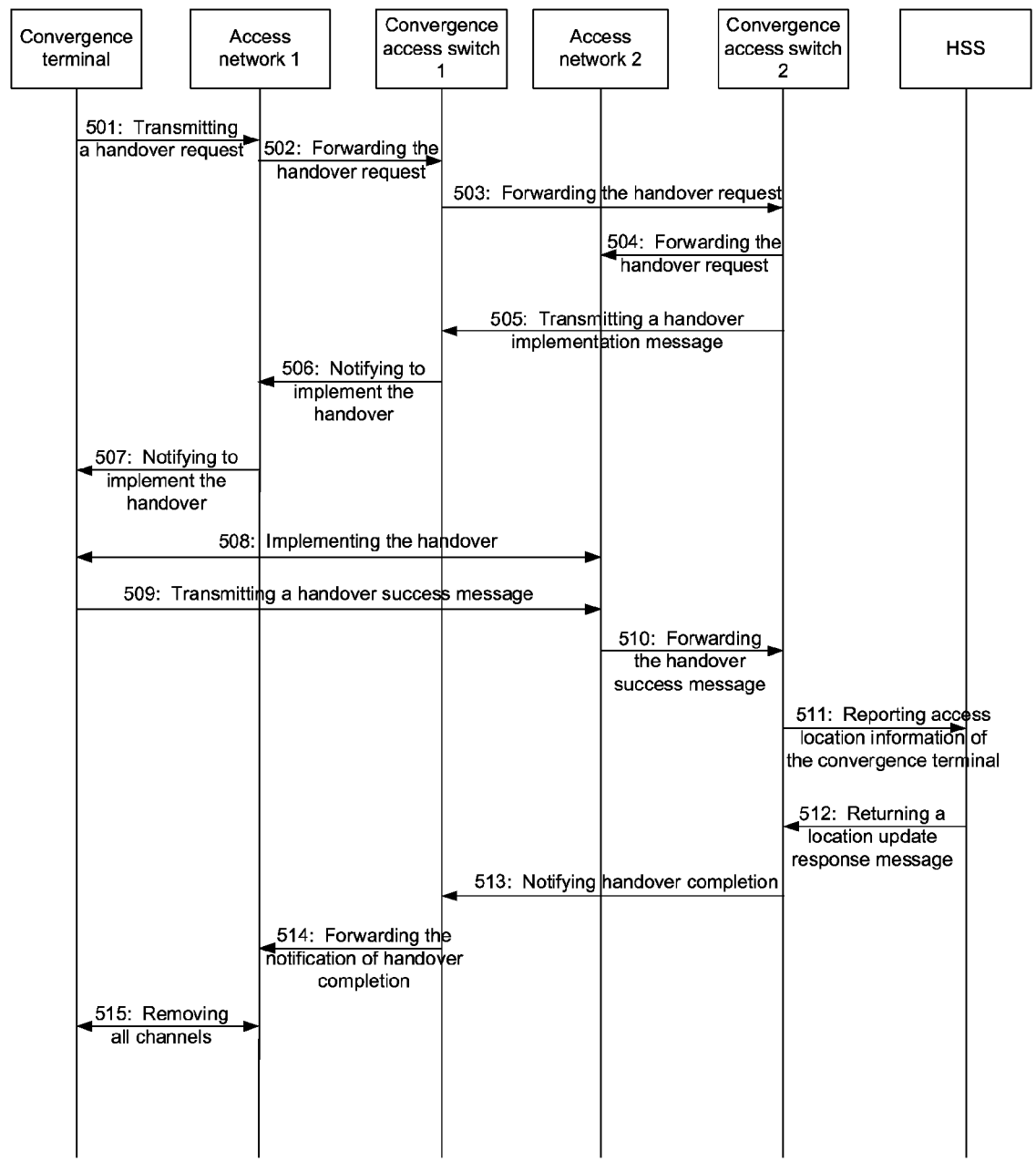
FIG. 5 shows a flowchart of a method for implementing handover according to Embodiment 2.

The application scene of the embodiment is: a convergence terminal 1 has accessed a network converging different access technologies via an access network 1 and a convergence access switch 1. An HSS stores user information of the convergence terminal. The location change of the convergence terminal leads to needing to perform a cell handover. The switched access network is referred to as access network 2. A convergence access switch to which the switched cell belongs is referred to as convergence access switch 2. The method for implementing handover in the embodiment, as shown in FIG. 5, includes the following steps:

Step 501: When the location of the convergence terminal is changed, the convergence terminal finds a new cell which is more suitable for communication, and transmits a handover request to the access network 1 when determining, according to a preset rule, that it is needed to switch a location.

Here, the handover request includes the location identifier of the target cell. The location identifier includes: a cell identifier, an identifier of the access network and an identifier of the convergence access switch. The convergence terminal can acquire the identifier of the convergence access switch, the identifier of the access network and the cell identifier through periodic broadcast of the access network.

Step 502: The access network 1 converts the format of the handover request, and forwards the converted handover request to the convergence access switch 1.

Here, the specific process of converting the format of the handover request can be implemented by existing technology.

Step 503: After the handover request is received, the convergence access switch 1 finds a convergence access switch 2 covering the target cell according to the location information of the target cell in the handover request, and forwards the handover request to the convergence access switch 2.

Step 504: After the handover request is received, the convergence access switch 2 checks the content of the handover request, and when it is determined, according to the condition of available resources of the convergence access switch 2, that there are enough resources to process the handover, the convergence access switch 2 determines the access network 2 according to the location information of the target cell in the handover request, and forwards the handover request to the access network 2.

Step 505: The convergence access switch 2 transmits a handover implementation message to the convergence access switch 1, notifying that the handover can be implemented.

Step 506: After the handover implementation message is received, the convergence access switch 1 notifies the access network 1 to implement the handover.

Step 507: After the notification is received, the access network 1 notifies the convergence terminal to implement the handover.

Step 508: After the notification is received, the convergence terminal cooperates with the access network 2 to implement the handover.

Here, the specific process of cooperating with the access network 2 to implement the handover can be implemented by existing technology. While the handover is performed, the convergence terminal establishes a control channel with the access network 2. Furthermore, if a traffic link exists between the convergence terminal and the access network 1, a corresponding traffic link needs to be established between the convergence terminal and the access network 2, for being prepared for the handover of traffic.

Step 509: After the handover is completed, the convergence terminal transmits a handover success message to the access network 2 through the newly-established control channel.

Step 510: After the handover success message is received, the access network 2 forwards the handover success message to the convergence access switch 2.

Step 511: After the handover success message is received, the convergence access switch 2 reports the access location information of the convergence terminal to the HSS.

Step 512: After the report is received, the HSS updates the access location information of the convergence terminal stored in the HSS, and returns a location update response message to the convergence access switch 2 after the update is completed.

Step 513: After the location update response message is received, the convergence access switch 2 notifies the convergence access switch 1 that the handover is completed.

Step 514: After the notification is received, the convergence access switch 1 forwards the notification of handover completion to the access network 1.

Step 515: After the forwarded notification is received, the access network 1 cooperates with the convergence terminal to remove all channels between them, so as to release all relevant resources.

Here, after Step 515 is completed, it is indicated that the handover is completed.

It should be noted that, in Steps 504 to 513, the convergence access switch 2 needs to establish a handover processing instance and to include the handover processing instance identifier in the corresponding message, so that the access switch 2 can timely update the information of the handover instance according to the received corresponding message.

Besides the scene of location change described in the above contents, the location change of the convergence terminal can also include two conditions. One condition is that location change occurs in one same access network. At this moment, no convergence access switch is needed, and no access location information needs to be reported to the HSS. The other condition is that location change occurs in different access networks. At this moment, a convergence access switch is needed, but no access location information needs to be reported to the HSS. The application scenario of this embodiment is most complex.

Here, it should be noted that, in consideration of the combination of more complex conditions of convergence terminal, such as power off, movement and reboot, the handover process of this embodiment is a simple scenario. Better processing can be obtained according to the handover process of this embodiment and with reference to existing technology. The specific implementation extended according to the handover process of this embodiment and with reference to existing technology is common technical means for those skilled in the art.

It can be seen from the above descriptions that users correspond to traffics in the disclosure. User number does not differ depending on different access technologies. One kind of same traffic can be supported by more than one access technology separately or jointly. There may be no concept of 2G users and 3G users instead of users of a certain operator or users of certain traffic.

In addition, in the disclosure, the selection of access technology may be dynamic. Namely, what access technology is adopted depends on the traffic applied for by a user and the specific condition of network resources at that time. During the process of performing traffic, the adopted access technology may be adjusted correspondingly along with the change of network state and the update of terminal location. The selection of access technology is transparent for a user, traffic and a network.

In the application of the disclosure, one user number generally corresponds to one convergence terminal only, but there may also be a plurality of convergence terminals. One kind of user traffic generally needs one pair of convergence terminals only, but there may also be a plurality of convergence terminals participating in the traffic. The features, locations and states of these convergence terminals are registered in the HSS as the attributes of the user. At this moment, the allocation and use of convergence terminals are in the charge of the traffic server.

The above are merely the preferred embodiments of the disclosure, and are not intended to limit the scope of protection of the claims of the disclosure.

The invention claimed is:

1. A communication system for converging different access technologies in the third generation (3G) or fourth generation (4G) mobile communication network, comprising: a convergence terminal, a first access network and a convergence core network, wherein the convergence core network comprises a first convergence access switch, a traffic server and a Home Subscriber Server (HSS), wherein
the convergence terminal is configured to access a network converging different access technologies, and to transmit a traffic request message including a traffic identifier to the first convergence access switch via the first access network when the convergence terminal is required to perform traffic;
the first convergence access switch is configured to acquire an address of the traffic server after the traffic request message including the traffic identifier is received, and to forward the traffic request message including the traffic identifier to the traffic server;
the traffic server is configured to perform information interaction with the HSS after the traffic request message forwarded by the first convergence access switch is received, and to provide traffic through the network converging different access technologies when it is determined that the traffic server is able to provide the traffic to a user corresponding to the convergence terminal; and
the HSS is configured to perform information interaction with the traffic server and to determine whether the traffic server is able to provide the traffic to the user corresponding to the convergence terminal;
wherein the first convergence access switch is further configured to determine, according to an available resource condition of the first convergence access switch, whether the traffic is able to be provided to the user corresponding to the convergence terminal, and to acquire the address of the traffic server when it is determined that the traffic is able to be provided to the user corresponding to the convergence terminal; and
the system further comprises a second access network, wherein the convergence core network further comprises a second convergence access switch, wherein
the convergence terminal is further configured to, when a cell handover is necessary, complete a handover process through message interaction between the convergence terminal and the first access network, message interaction between the first access network and the first convergence access switch, message interaction between the first convergence access switch and the second convergence access switch, message interaction between the second convergence access switch and the second access network, message interaction between the second access network and the convergence terminal, and message interaction between the second convergence access switch and the HSS;
the first access network is further configured to complete a handover process through message interaction with the convergence terminal and the first convergence access switch;
the first convergence access switch is further configured to complete a handover process through message interaction with the first access network and the second convergence access switch;
the second convergence access switch is further configured to complete a handover process through message interaction with the first convergence access switch, the second access network and the HSS;
the second access network is further configured to complete a handover process through message interaction with the second convergence access switch and the convergence terminal; and
the HSS is further configured to complete a handover process through message interaction with the second convergence access switch.

2. The system according to claim 1, further comprising a Business and Operation Support System (BOSS) configured to register user information to the HSS; and
the HSS is further configured to store the user information.

3. The system according to claim 1, wherein the traffic server is further configured to perform charging and statistics processing on the traffic when the traffic is provided through the network converging different access technologies.

4. A communication method for converging different access technologies in the third generation (3G) or fourth generation (4G) mobile communication network, comprising:
accessing, by a convergence terminal, a network converging different access technologies, and transmitting a traffic request message including a traffic identifier to a first convergence access switch via a first access network when the convergence terminal is required to perform traffic;
acquiring, by the first convergence access switch, an address of a traffic server after the traffic request message including the traffic identifier is received, and forwarding the traffic request message including the traffic identifier to the traffic server; and
performing, by the traffic server, information interaction with a Home Subscriber Server (HSS) after the traffic request message forwarded by the first convergence access switch is received, and providing traffic through the network converging different access technologies when it is determined that the traffic server is able to provide the traffic to a user corresponding to the convergence terminal; and the method further comprises: before the address of the traffic server is acquired, determining, by the first convergence access switch according to an available resource condition of the first convergence access switch, whether the traffic is able to be provided to the user corresponding to the convergence terminal, and acquiring the address of the traffic server when it is determined that the traffic is able to be provided to the user corresponding to the convergence terminal; and when it is determined that a cell handover is necessary, completing, by the convergence terminal, a handover process through message interaction between the convergence terminal and the first access network, message interaction between the first access network and the first convergence access switch, message interaction between the first convergence access switch and a second convergence access switch, message interaction between the second convergence access switch and a second access network, message interaction between the second access network and the convergence terminal, and message interaction between the second convergence access switch and the HSS;

completing, by the first access network, a handover process through message interaction with the convergence terminal and the first convergence access switch;

completing, by the first convergence access switch, a handover process through message interaction with the first access network and the second convergence access switch;

completing, by the second convergence access switch, a handover process through message interaction with the first convergence access switch, the second access network and the HSS;

completing, by the second access network, a handover process through message interaction with the second convergence access switch and the convergence terminal; and completing, by the HSS, a handover process through message interaction with the second convergence access switch.

5. The method according to claim 4, wherein the step of transmitting, by a convergence terminal, a traffic request message including a traffic identifier to a first convergence access switch via a first access network comprises:

transmitting, by the first convergence terminal, the traffic request message including the traffic identifier to the first access network; and after the traffic request message is received by the first access network and when it is determined, according to resource of the first access network, that the traffic is able to be provided to the user corresponding to the convergence terminal, transmitting, by the first access network, the traffic request message to the first convergence access switch.

6. The method according to claim 4, wherein the step of acquiring the address of the traffic server comprises:

acquiring, by the first convergence access switch, the address of the traffic server according to traffic instance established by the first convergence access switch; or acquiring, by the first convergence access switch, the address of the traffic server by inquiring in an address parser.

7. The method according to claim 4, further comprising: before the traffic server performs information interaction with the HSS, registering, by a Business and Operation Support System (BOSS), user information to the HSS.

8. The method according to claim 4, wherein the step of performing, by the traffic server, information interaction with the HSS when it is determined that the traffic server is able to provide traffic to the user corresponding to the convergence terminal comprises:

after the traffic server receives the traffic request message and determines, according to the resource of the traffic server, that the traffic server is able to provide the traffic to the user corresponding to the convergence terminal, establishing, by the traffic server, a traffic instance, acquiring an address of an HSS corresponding to the convergence terminal according to a user number corresponding to the convergence terminal, and transmitting traffic audit message to the HSS; and matching, by the HSS, a user number and traffic identifier in the received traffic audit message with user information saved in the HSS, and when the matching succeeds, returning the traffic server an audit response message which passes through an audit.

9. The method according to claim 4, wherein the step of providing the traffic through the network converging different access technologies comprises:

establishing, by the traffic server, a traffic link between the convergence terminal and a called convergence terminal performing traffic with the convergence terminal through message interaction between the traffic server and a convergence access switch to which the called convergence terminal belongs, message interaction between the traffic server and an HSS storing user information of the celled convergence terminal, and message interaction between a convergence access switch connected with the called convergence terminal and an access network connected with the called convergence terminal; and exchanging media content of the traffic between the convergence terminal and the called convergence terminal through the traffic link.

10. The method according to claim 4, further comprising: when the traffic is provided through the network converging different access technologies, performing charging and statistics processing on the traffic.

11. The method according to claim 9, further comprising:

releasing, by each network element providing service for the traffic, its own resource corresponding to the traffic after the traffic is completed.

* * * * *